United States Patent
Kons

(10) Patent No.: US 9,996,732 B2
(45) Date of Patent: Jun. 12, 2018

(54) LIVENESS DETECTOR FOR FACE VERIFICATION

(71) Applicant: International Business Machines Corporation, Armonk, NY (US)

(72) Inventor: Zvi Kons, Yokneam Ilit (IL)

(73) Assignee: International Business Machines Corporation, Armonk, NY (US)

(*) Notice: Subject to any disclaimer, the term of this patent is extended or adjusted under 35 U.S.C. 154(b) by 220 days.

(21) Appl. No.: 14/803,135

(22) Filed: Jul. 20, 2015

(65) Prior Publication Data

US 2017/0024608 A1 Jan. 26, 2017

(51) Int. Cl.
*G06K 9/00* (2006.01)
*G06K 9/62* (2006.01)
*G06T 7/68* (2017.01)

(52) U.S. Cl.
CPC ..... *G06K 9/00268* (2013.01); *G06K 9/00281* (2013.01); *G06K 9/00906* (2013.01);
(Continued)

(58) Field of Classification Search
CPC ........... G06K 9/00899; G06K 9/00906; G06K 9/00221; G06K 9/00248; G06K 9/00268;
(Continued)

(56) References Cited

U.S. PATENT DOCUMENTS 5,680,481 A * 10/1997 Prasad ............... G06K 9/00281
382/118
5,859,921 A * 1/1999 Suzuki ............... G06K 9/00268
382/118
(Continued)

FOREIGN PATENT DOCUMENTS

EP 0889438 A2 * 1/1999 ............... G06T 7/70

OTHER PUBLICATIONS

Fisher, R., S. Perkins, A. Walker, and E. Wolfart. "Affine Transformation." Affine Transformation. Image Processing Learning Resources, Mar. 28, 2013. Web. Apr. 21, 2017.*
(Continued)

*Primary Examiner* — Chan Park
*Assistant Examiner* — Geoffrey E Summers
(74) *Attorney, Agent, or Firm* — Ziv Glazberg

(57) ABSTRACT

A method, product and system for implementing liveness detector for face verification. A method comprising detecting a symmetry line of the face; and verifying that the subject moved the mouth by computing a score based on values of a pair of images in the symmetry lines, wherein the score is indicative to a difference in the shape of the mouth between the pair of images. Another method comprises: verifying identity of a subject based on facial recognition and voice recognition, said verifying comprise determining there is mouth movement in an image sequence, wherein said determining comprises: in each image of the sequence, detecting a symmetry line of the face; and verifying that the subject moved the mouth, wherein said verifying comprises: computing a score based on comparison of symmetry lines of the face in different images of the set of images; and comparing the score with a threshold.

19 Claims, 4 Drawing Sheets

(52) U.S. Cl.
CPC .............. *G06K 9/6215* (2013.01); *G06T 7/68* (2017.01); *G06T 2207/30201* (2013.01)

(58) Field of Classification Search
CPC .... G06K 9/00281; G06K 9/6215; G06T 7/68; G06T 2207/30201
USPC ......................................................... 382/118
See application file for complete search history.

(56) References Cited

U.S. PATENT DOCUMENTS

| | | | |
|---|---|---|---|
| 8,355,530 | B2 | 1/2013 | Park et al. |
| 8,848,986 | B2 | 9/2014 | Cavallini |
| 8,856,541 | B1 | 10/2014 | Chaudhury et al. |
| 2012/0063671 | A1* | 3/2012 | Yamada .............. G06K 9/00899 382/154 |
| 2013/0188840 | A1 | 7/2013 | Ma et al. |
| 2014/0016835 | A1* | 1/2014 | Song ....................... G10L 17/06 382/118 |
| 2014/0337948 | A1 | 11/2014 | Hoyos |

OTHER PUBLICATIONS

Szeliski, Richard. "Computer Vision." 2011, pp. 337-338.*
Singh, Avinash Kumar, Piyush Joshi, and Gora Chand Nandi. "Face recognition with liveness detection using eye and mouth movement." Signal Propagation and Computer Technology (ICSPCT), 2014 International Conference on. IEEE, 2014.*
"Distance Measures." Gene Expression Data Analysis Suite (GEDAS). Jun. 30, 2007.*
Chen, Xin, Patrick J. Flynn, and Kevin W. Bowyer. "Fully automated facial symmetry axis detection in frontal color images." Automatic Identification Advanced Technologies, 2005. Fourth IEEE Workshop on. IEEE, 2005.*
Parveen, Sajida, et al. "Face anti-spoofing methods." Curr. Sci 108.8 (2015): 1491-1500.*
Reisfeld, Daniel, and Yehezkel Yeshurun. "Robust detection of facial features by generalized symmetry." Pattern Recognition, 1992. vol. I. Conference A: Computer Vision and Applications, Proceedings., 11th IAPR International Conference on. IEEE, 1992.*
Singh et al., "Face Recognition with Liveness Detection using Eye and Mouth Movement", 2014 International Conference on Signal Propagation and Computer Technology (ICSPCT 2014), Jul. 2014, pp. 592-597.
Singh et al., "Face Recognition Using Facial Symmetry", Proceedings of the Second International Conference on Science, Engineering and Information Technology, Oct. 2012, pp. 550-554.
Nalinakshi et al., "Liveness Detection Technique for Prevention of Spoof Attack in Face Recognition System", International Journal of Emerging Technology and Advanced Engineering, Dec. 2013, vol. 3, Issue 12.
Kahm et al., "2D face liveness detection: An overview", 2012 BIOSIG—Proceedings of the International Conference of Biometrics Special Interest Group (BIOSIG), Sep. 2012.
Chakraborty et al., "An Overview of Face Liveness Detection", International Journal on Information Theory (IJIT), Apr. 2014, pp. 11-25, vol. 3, No. 2.
Kollreider et al., "Real-Time Face Detection and Motion Analysis With Application in "Liveness" Assessment", IEEE Transactions on Information Forensics and Security, Sep. 2007, pp. 548-558, vol. 2, No. 3.
Bredin et al., "Detecting Replay Attacks in Audiovisual Identity Verification", 2006 IEEE International Conference on Acoustics Speech and Signal Processing Proceedings, May 2006, pp. I-621-I-624, vol. 5.

\* cited by examiner

LIVENESS DETECTOR FOR FACE VERIFICATION

TECHNICAL FIELD

The present disclosure relates to biometric verification in general, and to facial recognition, in particular.

BACKGROUND

In facial recognition for biometric verification, the face of a person is used for verifying identity and authorizing access. Face information extracted from those images is compared to enrollment face information. If the captured face matches the enrollment data then the verification succeeds and the user is granted access.

However, such verification technique can be easily spoofed. One could be granted access simply by presenting a picture of an authorized person. One possible countermeasure is a liveness detector which attempts to determine whether the identified person presented is indeed alive.

BRIEF SUMMARY

One exemplary embodiment of the disclosed subject matter is a computer-implemented method comprising: obtaining a set of images of a face of a subject having a mouth, wherein the set of images are used for facial recognition of the subject; in at least two images of the set of images, automatically detecting a symmetry line of the face, wherein the symmetry line intersects at least a mouth region of the face; and automatically verifying that the subject moved the mouth, wherein said verifying comprises: computing a score based on values of a pair of images in the symmetry lines, wherein the score is indicative to a difference in the shape of the mouth between the pair of images; and determining the score is above a threshold.

Another exemplary embodiment of the disclosed subject matter is a verification method comprises: obtaining a set of images of a face of a subject having a mouth; obtaining a recording of a voice of the subject spoken while the set of images were captured; automatically verifying identity of the subject based on facial recognition and voice recognition, wherein said verifying comprise determining there is mouth movement in the set of images, wherein said determining comprises: in each image of the set of images, automatically detecting a symmetry line of the face of the subject; and automatically verifying that the subject moved the mouth, wherein said verifying comprises: computing a score based on comparison of symmetry lines of the face in different images of the set of images; and determining that the score is above a threshold.

Yet another exemplary embodiment of the disclosed subject matter is a computerized apparatus having a processor, the processor being adapted to perform the steps of: obtaining a set of images of a face of a subject having a mouth, wherein the set of images are used for facial recognition of the subject; in at least two images of the set of images, automatically detecting a symmetry line of the face, wherein the symmetry line intersects at least a mouth region of the face; and automatically verifying that the subject moved the mouth, wherein said verifying comprises: computing a score based on values of a pair of images in the symmetry lines, wherein the score is indicative to a difference in the shape of the mouth between the pair of images; and determining the score is above a threshold.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to implement a reliable liveness detector.

Another technical problem is to stability and reliability identify sufficient information about a facial feature from an image without identifying the facial region itself.

One technical solution is to combine face recognition with voice recognition. For the voice verification, the user is required to say a given parse or password and the images are captured while the user speaks. In this case in a mouth movements are indicative of the subject being alive, as opposed to being presented with still images of the subject during a spoof attempt.

Another technical solution is to analyze the mouth movement without relying on identification of the mouth region in the image by detecting various facial landmarks. Methods which are based on identification of face landmarks may not be practical. It may be hard to extract stable face landmarks, which may require identification of exact borders of the face landmark in each image. A correct identification of the mouth area might be problematic for people with various facial features such as beards and mustaches. Variations of the landmarks placements between different images may be mistaken as a movement of face parts, and therefore problematic for the analysis of the disclosed subject matter.

In some exemplary embodiments, identification of mouth movement may be achieved based on analysis of a symmetry line of the face. The symmetry line is a vertical line which crosses the face in the middle. The symmetry line may pass between the eyes, in a middle of the nose and of the mouth. By analyzing pixels on the symmetry line, it may be determined whether or not a subject had moved her mouth. In some exemplary embodiments, the location of this line depends on information from the whole face and it is therefore may be more stable than landmarks that depends only on local features.

In some exemplary embodiments, the symmetry line crosses the mouth at the middle and may provide a cross section of the mouth at its widest point. This section can be used to compare the mouth shape between two or more frames and to identify mouth movements.

One technical effect of the disclosed subject matter is in providing a relatively stable and accurate method. In some exemplary embodiments, the method also provides a relative high percentage of spoofing attacks detection with relatively low false (positive/negative) indications.

Another technical effect is in enabling mouth movement analysis without identifying the mouth region and boundaries thereof.

Figure 1:
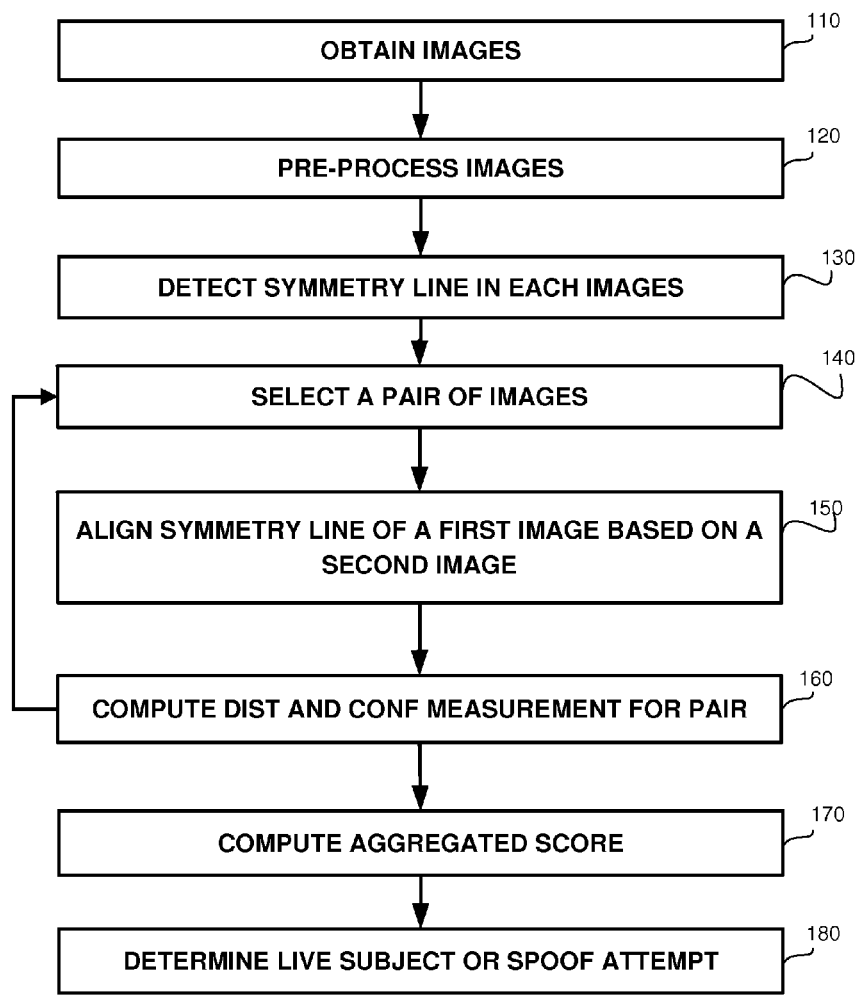
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the subject matter.

In Step 110, images are obtained. The images may be a set of images of the subject and depicting a face of a subject. The images may have been captured during a time in which the subject was required to speak. Optionally, the images are captured by a camera of a device, while a microphone of the device captures audio stream. The device may be an authentication device, a computing device, such as a personal computer, mobile phone, Personal Digital Assistant (PDA), or the like, having installed thereon authentication software, or the like.

In Step 120, the images may be pre-processed. In some exemplary embodiments, colored pictures are converted to grayscale, whereby each pixel may be represented by an intensity measurement. In some exemplary embodiments, the images may be processed, such as by applying filters on the images. As an example, a 2D high pass filter may be applied to compensate for lighting changes.

Step 130 may be performed for each image. In Step 130, a symmetry line of the face of the subject is detected. In some exemplary embodiments, a face detector may detect the face within the image. The symmetry line may be detected within the face.

Figure 3A:
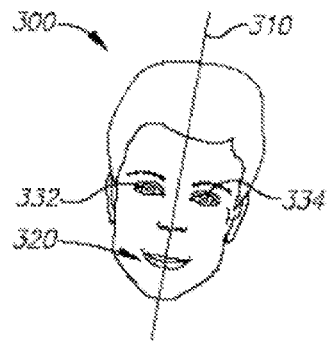
FIGS. 3A and 3B show illustrations of an image of a face, in accordance with some exemplary embodiments of the disclosed subject matter.
Figure 3B:
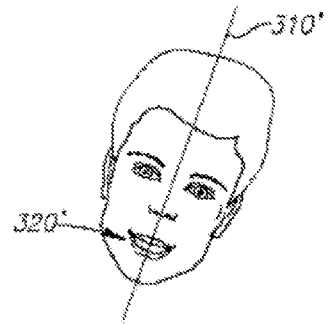

Referring now to FIG. 3A illustrating Symmetry Line 310 of Face 300. As can be appreciated, Symmetry Line 310 is tilted based on an angle of Face 300. Symmetry Line 310 crosses Mouth 320. In FIG. 3B, another image of the same subject is illustrated. Symmetry Line 310' crosses Mouth 320', which is open. As can be appreciated, each image has a different symmetry line, as a tilt angle may be different in each image.

In some exemplary embodiments, a symmetry operator, S, may be defined as follows:

$$S(x, y, \theta) = \int_{(x_1, y_1) \in \Omega} |m(x_1, y_1) - m(x_2, y_2)|,$$

wherein m is an intensity value of the image in a point, wherein $(x_2, y_2)$ is a reflection of a point $(x_1, y_1)$ over a symmetry line, $\theta$ is an angle of the symmetry line, and $\Omega$ is half a circle with center at $(x, y)$ and a radius in accordance with a size of the face. In some exemplary embodiments, the following define the reflection point: $x_2=x_1+2d \cos(\theta)$, $y_2=y_1-2d \sin(\theta)$, $d=-(x_1-x)\cos(\theta)+(y_1-y)\sin(\theta)$.

Figure 5:
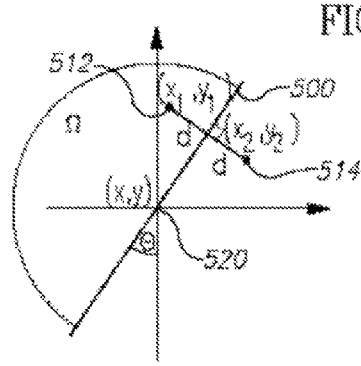
FIG. 5 illustrates the geometry of the symmetry operator, in accordance with the disclosed subject matter.

FIG. 5 illustrate the geometry of the symmetry operator. Symmetry Line 500 is tilted and angled at an angle of $\theta$. Symmetry Line 500 passes through Center 520 $(x, y)$. A half circle having a Center 520 $(x, y)$ and a radius in accordance with a size of a face of the subject (e.g., about the lateral radius of the face, 80% of the lateral radius of the face, 75% of the vertical radius of the face, or the like) is denoted as $\Omega$. Every point in $\Omega$ is reflected by Symmetry Line 500 and its corresponding point is expected to be substantially similar to the point (e.g., similar intensity values). As an example, Point 512 $(x_1, y_1)$ is reflected by Symmetry Line 500 to Point 514 $(x_2, y_2)$, each of which is at a distance of d from Symmetry Line 500.

In some exemplary embodiments, if the symmetry operator is applied with correct parameters (e.g., correct $(x, y)$ and $\theta$) which match the symmetry line of the face in the image, the value returned is expected to be close to zero as image intensity of each point in $\Omega$ is expected to be similar to that of the reflected point which is reflected by the symmetry line.

In some exemplary embodiments, two points that are expected to be in opposite sides of the symmetry line may be selected (e.g., Points 512 and 514; denoted as $(x_R, y_R)$ and $(x_L, y_L)$). In some exemplary embodiments, the location of the two eyes can be used (e.g., 332 and 334 of FIG. 3A). A search may be performed between those two point and with various angles to find the minimal value of the symmetry operator. The results of such a search may be the parameters of the symmetry line. In some exemplary embodiments, the search may be formally defined as follows:

$$(x_s, y_s, \theta_s) = \operatorname*{argmin}_{\alpha \in [0,1], \theta' \in [-\Pi/2, \Pi/2]} S(\alpha \cdot x_L + (1-\alpha) \cdot x_R, \alpha \cdot y_L + (1-\alpha) \cdot y_R, \theta').$$

In some exemplary embodiments, the symmetry line may be represented by the parametric equation:

$$\begin{pmatrix} x \\ y \end{pmatrix} = \begin{pmatrix} x_s \\ y_s \end{pmatrix} + \begin{pmatrix} \sin\theta_s \\ \cos\theta_s \end{pmatrix} t.$$

In some exemplary embodiments, the symmetry line may be used to extract image intensity cross section along the symmetry line: $v(t)=m(x_s+t \cdot \sin(\theta_s), y_s+t \cdot \cos(\theta_s))$, where t is a value within the upper and lower face boundaries.

Referring back to FIG. 1. In Step 140, a pair of images out of the set of images is selected. The pair of images may be compared to determine likelihood of mouth movement. In some exemplary embodiments, every pair of images may be analyzed iteratively.

Figure 4A:
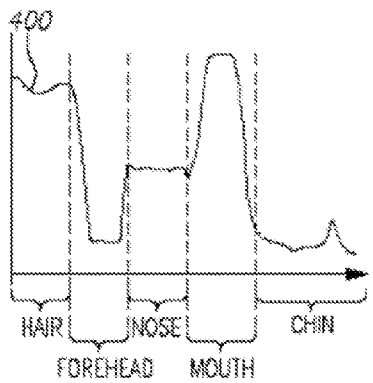
FIGS. 4A and 4B show an illustration of an intensity curve along the symmetry lines of FIGS. 3A and 3B, in accordance with the disclosed subject matter.
Figure 4B:
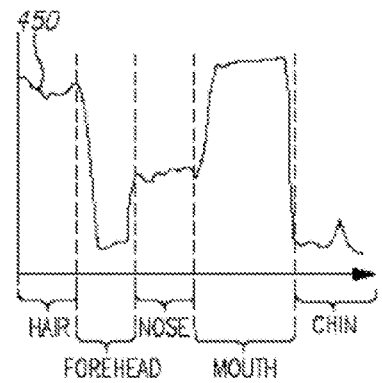

In Step 150, a symmetry line of a first image of the pair may be aligned based on a second image. In some exemplary embodiments, the symmetry line around static face landmarks may be relatively constant and similar in different images of the subject. For example, referring to FIGS. 4A and 4B, Intensity Curve 400 and Intensity Curve 450 may depict the intensity value at the Symmetry Lines 310 and 310', respectively. As can be appreciated from the figures, different sections of the curves relate to different areas of the face, such as hair, forehead, nose, mouth and chin. In some exemplary embodiments, some face landmarks remain relatively constant, such as hair, forehead and nose, while others may change depending from one picture to another, such as the mouth and chin. In some exemplary embodiments, it may be expected that the intensity levels from the area of the forehead and the nose may be similar in both images. Such information may be used to align one symmetry line based on the other. The alignment may compensate for scale changes, translation, or the like.

In some exemplary embodiments, alignment may be performed by solving the following:

$$(\alpha_s, \beta_s) = \underset{\alpha, \beta}{\operatorname{argmin}}\left(\int_{t \in r_U} |v_1(t) - v_2(\alpha \cdot t + \beta)| dt\right),$$

where $\alpha$ and $\beta$ are scale and translation parameters, respectively, and the alignment is performed over $r_U$ which includes the expected range of the static landmarks (e.g., face and nose; for example ⅔ of the image intensity cross section). The aligned symmetry line may be represented by a modified function: $v'(t) = v(\alpha_s \cdot t + \beta_s)$.

In Step 160, measurements useful for computing a score may be computed. In some exemplary embodiments, a distance measurement may be computed between two aligned symmetry lines. In some exemplary embodiments, the distance measurement may be computed as follows:

$$dist(v_1, v_2) = 1 - \frac{1}{r_L \sigma_1 \sigma_2} \int_{t \in r_L} (v_1(t) - \mu_1)(v_2(t) - \mu_2) dt,$$

where $\mu$ and $\sigma$ are the mean and standard deviation of each symmetry line, and where $r_L$ is a range that is expected to include the mouth (e.g., lower ⅓ of the image intensity cross section). In some exemplary embodiments, a distance measurement may be used as a score indicative of whether there is a change in the mouth between the two images.

In some exemplary embodiments, a confidence measurement may be computed. In some exemplary embodiments, the confidence measurement may be computed as follows:

$$conf(v_1, v_2) = \exp\left[-\int_{t \in r_U} v|_1(t) - v_2(t)| dt\right].$$

In some exemplary embodiments, Steps 140-160 may be repeated for additional pairs of images. In some exemplary embodiments, each pair of images is processed. Additionally or alternatively, pairs of sequential images are analyzed, or the like.

In Step 170, an aggregated score may be computed. The score may aggregate individual measurements of pairs of images into a single measurement. In some exemplary embodiments, the score may be computed as a weighted sum of a distance measure for each pair:

$$score = \exp\left[\frac{\sum_{i \neq j} dist(v_i, v_j) \cdot conf(v_i, v_j)}{\sum_{i \neq j} conf(v_i, v_j)}\right].$$

In some exemplary embodiments, an aggregated confidence score may be computed for the entire set, such as by summing the individual confidence measurements:

$$conf = \sum_{i \neq j} conf(v_i, v_j).$$

In Step 180, a determination may be made as to whether the images are of a captures live subject moving her mouth or they are a spoof attempt. In some exemplary embodiments, the determination may be performed by comparing the aggregated score and confidence values with predetermined score and confidence thresholds. In some exemplary embodiments, the thresholds may be calibrated to achieve a desired false alarms and misdetections rates.

Figure 2:
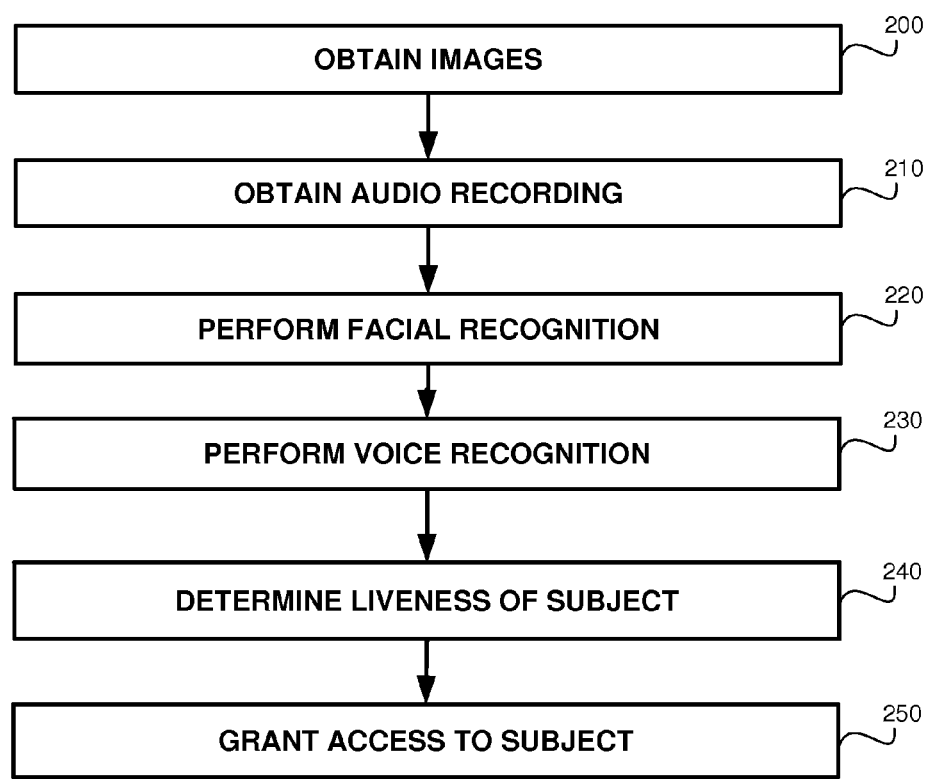
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the subject matter.

In Step 200, images are obtained.

In Step 210, an audio recordation is obtained. In some exemplary embodiments, the audio is recorded while the images are being captured and while the subject of the images is instructed to speak.

In Step 220, facial recognition is performed using the pictures to ensure that the captured subject is an authorized user. In some exemplary embodiments, facial recognition may be individually performed for each image. Additionally or alternatively, facial recognition may be performed with respect to a single image to determine the identity of the subject and additional images are used to verify the determined identity.

In Step 230, voice recognition of the audio recordation is performed to ensure that the recorded voice belongs to an authorized user. In some exemplary embodiments, voice recognition may be utilized to ensure that the voice belongs to the same user identified in Step 220.

In Step 240, liveness determination of the subject of the image may be performed in accordance with the disclosed subject matter. In some exemplary embodiments, the liveness determination comprises analyzing the images to verify that the subject is moving her mouth during a speaking session.

In Step 250, based on identification of the subject as an authorized user, using both facial recognition and using voice recognition, and based on a liveness determination that rules out a spoofing attempt, the subject may be granted access to a restricted location, data or the like.

Figure 6:
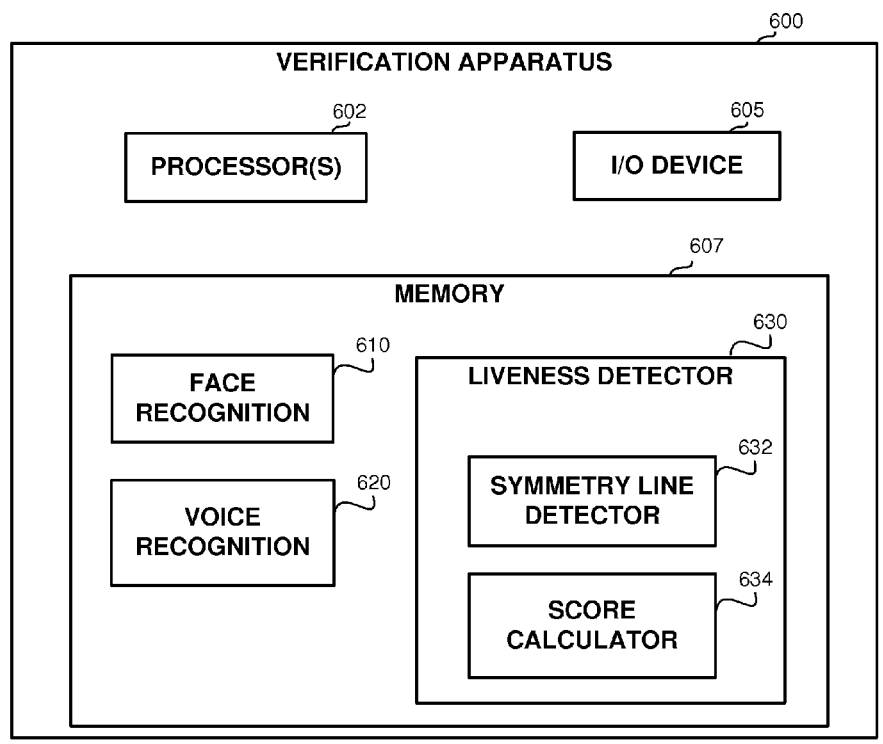
FIG. 6 shows a block diagram of an apparatus, in accordance with some exemplary embodiments of the disclosed subject matter.

Referring now to FIG. 6 showing a block diagram of an apparatus, in accordance with some exemplary embodiments of the disclosed subject matter.

An Apparatus 600 may be configured to provide for biometric verification and, in accordance with the disclosed subject matter. In some exemplary embodiments, Apparatus 600 may be a mobile computing device, such as a personal computer, a server, a smartphone, a Personal Digital Assistant (PDA), or the like.

In some exemplary embodiments, Apparatus 600 may comprise one or more processor(s) 602. Processor 602 may be a Central Processing Unit (CPU), a microprocessor, an electronic circuit, an Integrated Circuit (IC) or the like. Processor 602 may be utilized to perform computations required by Apparatus 600 or any of it subcomponents.

In some exemplary embodiments of the disclosed subject matter, Apparatus 600 may comprise an Input/Output (I/O) Module 605. I/O Module 605 may be utilized to receive images which are captured by a camera (not shown), audio recordings captured by a microphone (not shown), or the like. I/O Module 605 may be used to provide output indicating successful or unsuccessful verification attempt. In some exemplary embodiments, I/O Module 605 may be configured to alert when a spoof attempt is detected by Liveness Detector 630.

In some exemplary embodiments, Apparatus 600 may comprise a Memory 607. Memory 607 may be a hard disk drive, a Flash disk, a Random Access Memory (RAM), a memory chip, or the like. In some exemplary embodiments, Memory 607 may retain program code operative to cause Processor(s) 602 to perform acts associated with any of the subcomponents of Apparatus 600.

In some exemplary embodiments, a Face Recognition Unit 610 which is configured to analyze an image and determine an identity of a subject appearing in the image. In some exemplary embodiments, Face Recognition Unit 610 may be configured to verify that a captured subject is a specific person, such as the person identified by a digital certificate, password, or the like. Face Recognition Unit 610 may analyze images obtained by I/O Module 605.

In some exemplary embodiments, a Voice Recognition Unit 620 may be configured to perform voice recognition on audio recordings. Voice Recognition Unit 620 may be configured to verify the identity of the subject speaking in the audio recording is the same as appears in the images and recognized by Face Recognition Unit 610. Face Recognition Unit 610 may analyze voice recordings obtained by I/O Module 605.

In some exemplary embodiments, Liveness Detector 630 may be configured to determine whether the subject appears in the images analyzed by Face Recognition Unit 610 is consistent with a subject speaking the recorded voice, which was recognized by Voice Recognition Unit 620. In some exemplary embodiments, Liveness Detector 630 may determine whether the images are indicative of the subject moving her mouth.

In some exemplary embodiments, Liveness Detector 630 may utilize a Symmetry Line Detector 632 to detect symmetry lines of a face in an image. Liveness Detector 630 may compare pairs of images by comparing their respective symmetry lines, which may be aligned, such as using a linear transformation accounting for translation and scale changes. Score Calculator 634 may be configured to calculate a score of the set of images that are analyzed by Liveness Detector 630. The score may be indicative of whether the images are of a live subject or they are part of a spoof attempt in which potentially still images may be used.

In some exemplary embodiments, Liveness Detector 630 may analyze a relatively large number of images, such as 10, 20, 30, 50 frames or more, so as to make it more difficult to fool it by placing still images. During a speaking session the user may be instructed to speak and during such session, which may last a short time, such as 2-5 seconds, many frames may be taken and used. It may not be feasible for a person to manually present a large number of pictures with varying mouth sizes during such short speaking session.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining a set of images of a face of a subject having a mouth, wherein the set of images are used for facial recognition of the subject, wherein the set of images are obtained during a speaking session in which the subject is instructed to speak;
    in at least two images of the set of images, automatically detecting a straight line in each image, wherein the straight line is a symmetry line of the face, wherein the symmetry line intersects at least a mouth region of the face, wherein the symmetry line comprises a plurality of pixels representing the mouth and at least one pixel below the mouth and one pixel above the mouth; and
    automatically verifying that the subject moved the mouth to speak during the speaking session, wherein said verifying comprises:
        computing a score based on values of a pair of images in the symmetry lines, wherein the score is indicative to a difference in an opening of the mouth between the pair of images; and
        determining the score is above a threshold, wherein said computing the score comprises computing an integral of a function along a range, wherein the function comprises multiplying a difference between a value in a first symmetry line and a statistical measurement of the first symmetry line and a difference between a value in a second symmetry line and a statistical measurement of the second symmetry line.

2. The computer-implemented method of claim 1, wherein said computing the score is performed with respect to the mouth region.

3. The computer-implemented method of claim 1,
    wherein said automatically detecting a symmetry line is performed with respect to each image of the set of images;
    wherein the score is an aggregated score, wherein said computing the aggregated score comprises computing, for each pair of images in the set of images, a pair score based on values of the pair of images in the symmetry lines; and aggregating the pair scores.

4. The computer-implemented method of claim 1, wherein said verifying comprises computing a confidence measurement and determining the confidence measurement is above a threshold.

5. The computer-implemented method of claim 1, wherein the score is based on a distance measurement between the symmetry lines at the mouth region.

6. The computer-implemented method of claim 1, wherein said automatically verifying is performed without identifying the mouth region in the set of images.

7. The computer-implemented method of claim 1, wherein the set of images are in grayscale, wherein a value of an image in the symmetry line is an intensity value.

8. The computer-implemented method of claim 1, wherein said computing the score comprises:
    aligning a first image of the pair of images based on a second image of the pair of images, wherein said aligning is a linear transformation compensating for translation and scale changes, wherein said aligning is performed with respect to a second region intersected by the symmetry lines.

9. The computer-implemented method of claim 1, wherein said automatically detecting comprises: obtaining two points; and minimizing a value of a symmetry operator based on points in between the two points to determine parameters of the symmetry line, wherein the parameters include at least an angle of the symmetry line.

10. The computer-implemented method of claim 9, wherein said obtaining two points comprises obtaining a point of a first eye and obtaining a point of a second eye.

11. The computer-implemented method of claim 1, wherein said automatically detecting the symmetry line comprises: computing a value of a symmetry operator $$S(x, y, \theta) = \int_{(x_1,y_1)\in\Omega} |m(x_1, y_1) - m(x_2, y_2)|,$$

wherein m is an intensity value of the image in a point, wherein $(x_2, y_2)$ is a reflection of a point $(x_1, y_1)$ over the symmetry line, wherein $\theta$ is an angle of the symmetry line, wherein $(x_2, y_2)$ is determined based on $(x_1, y_1)$ using $\theta$, and wherein $\Omega$ is half a circle with center at (x, y) and a radius in accordance with a size of the face.

12. The computer-implemented method of claim 1, wherein said computing the score comprises computing a following distance measurement:

$$dist(v_1, v_2) = 1 - \frac{1}{r_L \sigma_1 \sigma_2} \int_{t \in r_L} (v_1(t) - \mu_1)(v_2(t) - \mu_2) dt,$$

wherein $v_1(t)$ is a value of a first symmetry line in a location t, wherein $\mu_1$ is a mean value of the first symmetry line, wherein $\sigma_1$ is a standard deviation of the first symmetry line, wherein $v_2(t)$ is a value of a second symmetry line in a location t, wherein $\mu_2$ is a mean value of the second symmetry line, wherein $\sigma_2$ is a standard deviation of the second symmetry line, wherein $r_L$ is a range in which the first and second symmetry lines comprise at least a mouth region.

13. The computer-implemented method of claim 1, wherein said automatically detecting a straight line in each image is performed without relying on identification of facial landmarks in each image.

14. A verification method comprising:
obtaining a set of images of a face of a subject having a mouth, wherein the set of images are obtained during a speaking session in which the subject is instructed to speak;
obtaining a recording of a voice of the subject spoken while the set of images were captured;
automatically verifying identity of the subject based on facial recognition and voice recognition, wherein said verifying comprises determining there is mouth movement in the set of images, wherein said determining comprises:
in each image of the set of images, automatically detecting a straight line in each image, wherein the straight line is a symmetry line of the face of the subject; and
automatically verifying that the subject moved the mouth to speak during the speaking session, wherein said verifying comprises: computing a score based on comparison of symmetry lines of the face in different images of the set of images; and
determining that the score is above a threshold, wherein said computing the score comprises computing an integral of a function along a range, wherein the function comprises multiplying a difference between a value in a first symmetry line and a statistical measurement of the first symmetry line and a difference between a value in a second symmetry line and a statistical measurement of the second symmetry line.

15. A computerized apparatus having a processor, the processor being adapted to perform steps of:
obtaining a set of images of a face of a subject having a mouth, wherein the set of images are used for facial recognition of the subject, wherein the set of images are obtained during a speaking session in which the subject is instructed to speak;
in at least two images of the set of images, automatically detecting a straight line in each image, wherein the straight line is a symmetry line of the face, wherein the symmetry line intersects at least a mouth region of the face, wherein the symmetry line comprises a plurality of pixels representing the mouth and at least one pixel below the mouth and one pixel above the mouth; and
automatically verifying that the subject moved the mouth to speak during the speaking session, wherein said verifying comprises:
computing a score based on values of a pair of images in the symmetry lines, wherein the score is indicative to a difference in an opening of the mouth between the pair of images; and
determining the score is above a threshold, wherein said computing the score comprises computing an integral of a function along a range, wherein the function comprises multiplying a difference between a value in a first symmetry line and a statistical measurement of the first symmetry line and a difference between a value in a second symmetry line and a statistical measurement of the second symmetry line.

16. The computerized apparatus of claim 15, wherein said automatically detecting a symmetry line is performed with respect to each image of the set of images;
wherein the score is an aggregated score, wherein said computing the aggregated score comprises computing, for each pair of images in the set of images, a pair score based on values of the pair of images in the symmetry lines; and aggregating the pair scores.

17. The computerized apparatus of claim 15, wherein the score is based on a distance measurement between the symmetry lines at the mouth region.

18. The computerized apparatus of claim 15, wherein said computing the score comprises:
aligning a first image of the pair of images based on a second image of the pair of images, wherein said aligning is a linear transformation compensating for translation and scale changes, wherein said aligning is performed with respect to a second region intersected by the symmetry lines.

19. The computerized apparatus of claim 15, wherein said automatically detecting comprises: obtaining two points; and minimizing a value of a symmetry operator based on points in between the two points to determine parameters of the symmetry line, wherein the parameters include at least an angle of the symmetry line.

* * * * *